United States Patent [19]

Yaguchi

[11] Patent Number: 5,818,870
[45] Date of Patent: Oct. 6, 1998

[54] DIGITAL COMMUNICATION DEVICE

[75] Inventor: Tatsuya Yaguchi, Yokohama, Japan

[73] Assignee: Canon Kabushiki Kaisha, Tokyo, Japan

[21] Appl. No.: 748,527

[22] Filed: Aug. 22, 1991

[30] Foreign Application Priority Data

Aug. 28, 1990 [JP] Japan .................................... 2-224342
Aug. 30, 1990 [JP] Japan .................................... 2-226518
Aug. 30, 1990 [JP] Japan .................................... 2-226519

[51] Int. Cl.[6] ............................................. H04B 1/38
[52] U.S. Cl. ...................... 375/219; 375/222; 375/242; 375/350
[58] Field of Search .............................. 375/7, 8, 25, 55, 375/60, 102, 103, 222, 225, 219, 242, 259, 296, 350; 364/723; 370/84, 914

[56] References Cited

U.S. PATENT DOCUMENTS

| | | | |
|---|---|---|---|
| 3,988,607 | 10/1976 | Eggermont et al. | 375/103 |
| 3,997,773 | 12/1976 | Van Essen et al. | 375/103 |
| 4,021,616 | 5/1977 | Betts | 370/84 |
| 4,035,724 | 7/1977 | Stephenne et al. | 375/251 |
| 4,044,306 | 8/1977 | Villeret et al. | 375/251 |
| 4,306,222 | 12/1981 | Peek et al. | 375/103 |
| 4,581,750 | 4/1986 | Dieleman | 375/55 |
| 4,609,941 | 9/1986 | Carr et al. | |
| 4,660,216 | 4/1987 | Classen et al. | 375/60 |
| 4,672,633 | 6/1987 | Classen et al. | 375/60 |
| 4,700,226 | 10/1987 | Acampora | 358/136 |
| 4,771,335 | 9/1988 | Obara . | |
| 4,837,812 | 6/1989 | Takahashi et al. | 379/98 |
| 4,860,115 | 8/1989 | Ogura . | |
| 5,001,711 | 3/1991 | Obana et al. | 370/84 |
| 5,038,365 | 8/1991 | Belloc et al. | 375/8 |
| 5,136,618 | 8/1992 | Wright, Jr. | 375/122 |
| 5,148,167 | 9/1992 | Ribner | 341/143 |
| 5,199,046 | 3/1993 | Ling | 370/84 |
| 5,432,511 | 7/1995 | Sadjadan et al. | 341/61 |
| 5,519,395 | 5/1996 | Büchler et al. | 341/61 |

FOREIGN PATENT DOCUMENTS 2200510  8/1988  United Kingdom .

OTHER PUBLICATIONS

Schonfelder, "Digitale Filter in der Videotechnik," Drei–R–Verlag, Berlin, 1988, pp. 121–124.
Pat. Abs. JP. vol. 13, No. 404, Sept. 7, 1989.

Primary Examiner—Stephen Chin
Attorney, Agent, or Firm—Fitzpatrick, Cella, Harper & Scinto

[57] ABSTRACT

A digital communication device of the present invention is provided with a modulation circuit for modulating a digital transmit signal, a first interpolater for converting the modulated signal in frequency, a coding circuit for coding the signal converted in frequency into an audio PCM transmission code with reference to a voice companding code table, a decoding circuit for decoding a coded audio PCM receive code into a digital signal with reference to the voice companding code table, a second interpolater for converting the decoded digital signal in frequency, and a demodulation circuit for demodulating the converted signal, and digitally performs modem modulation/demodulation and voice codec processing.

38 Claims, 15 Drawing Sheets

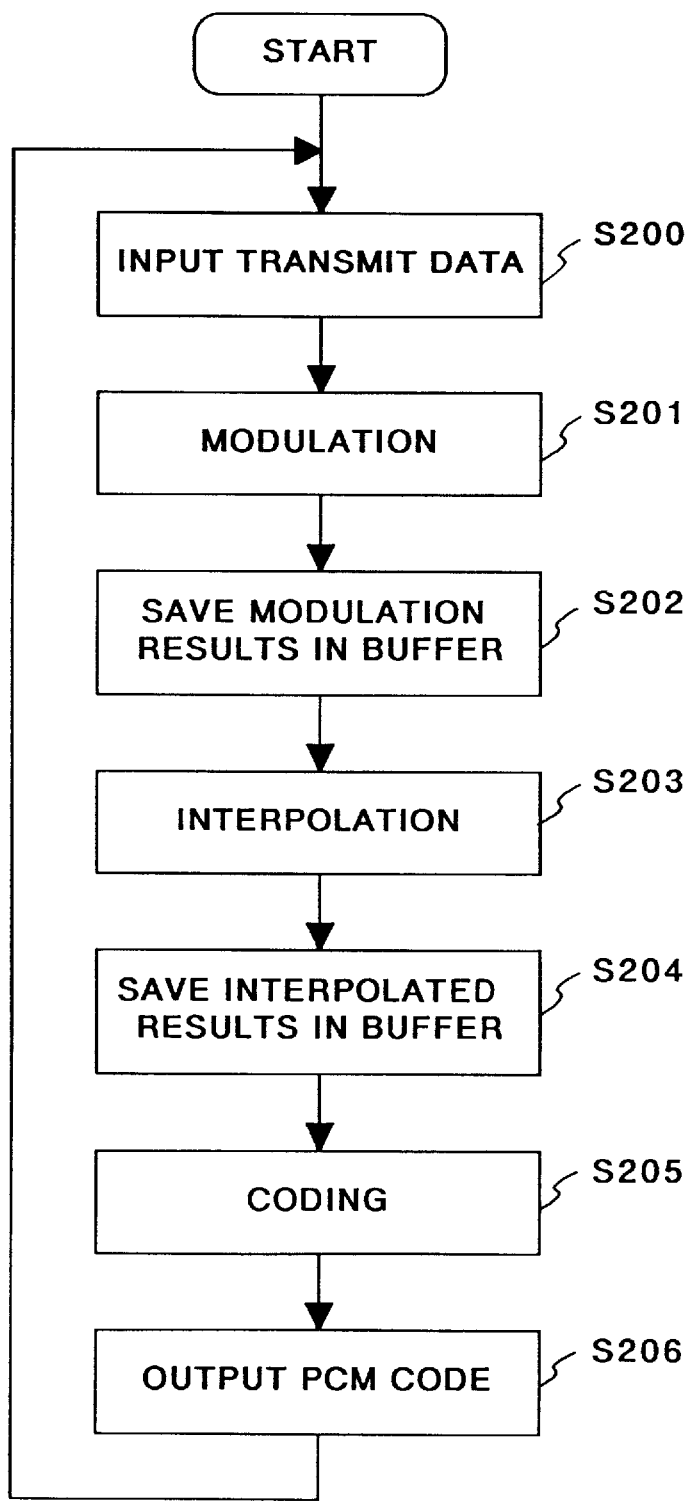
F I G. 2

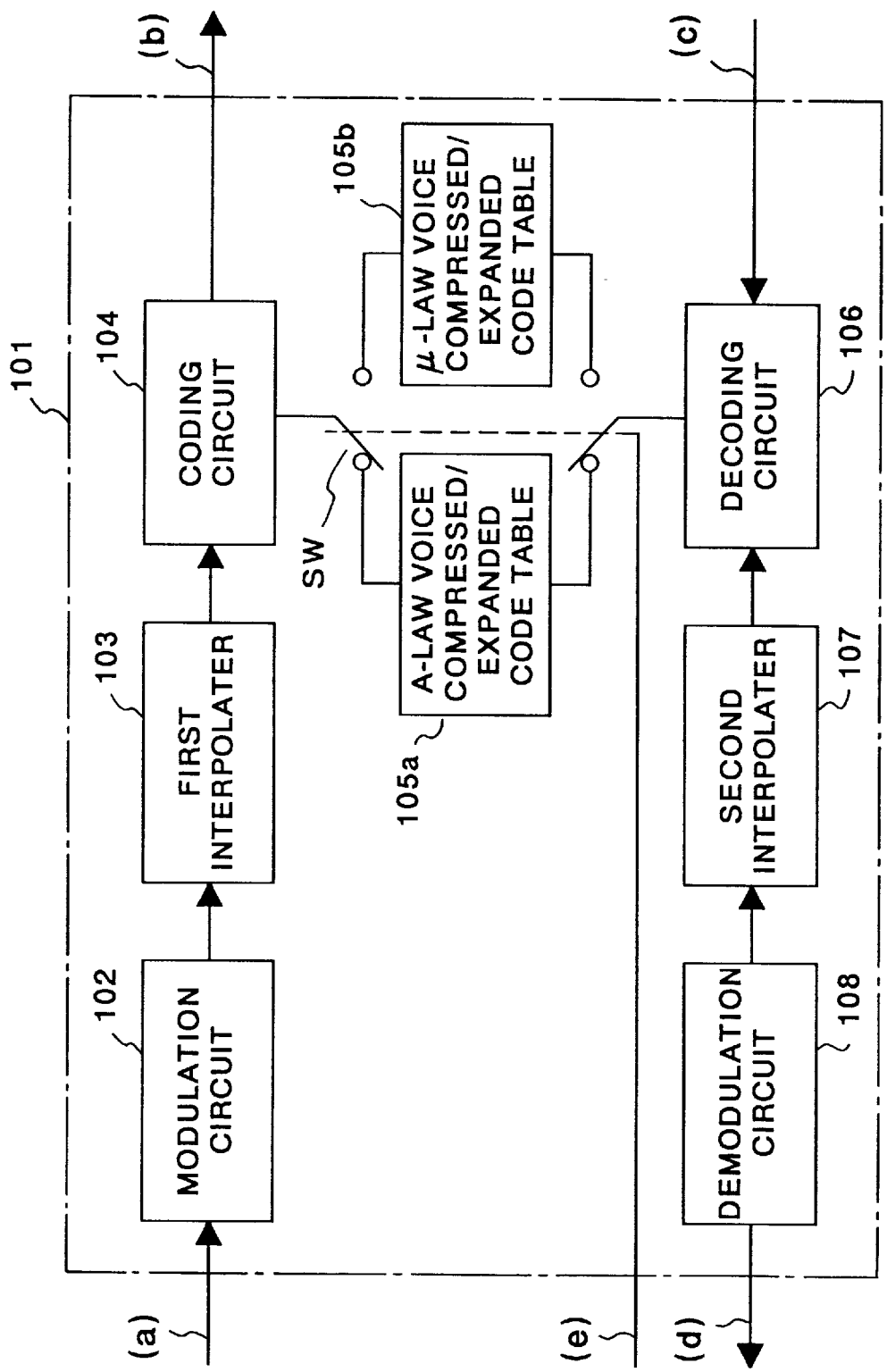
F I G. 11

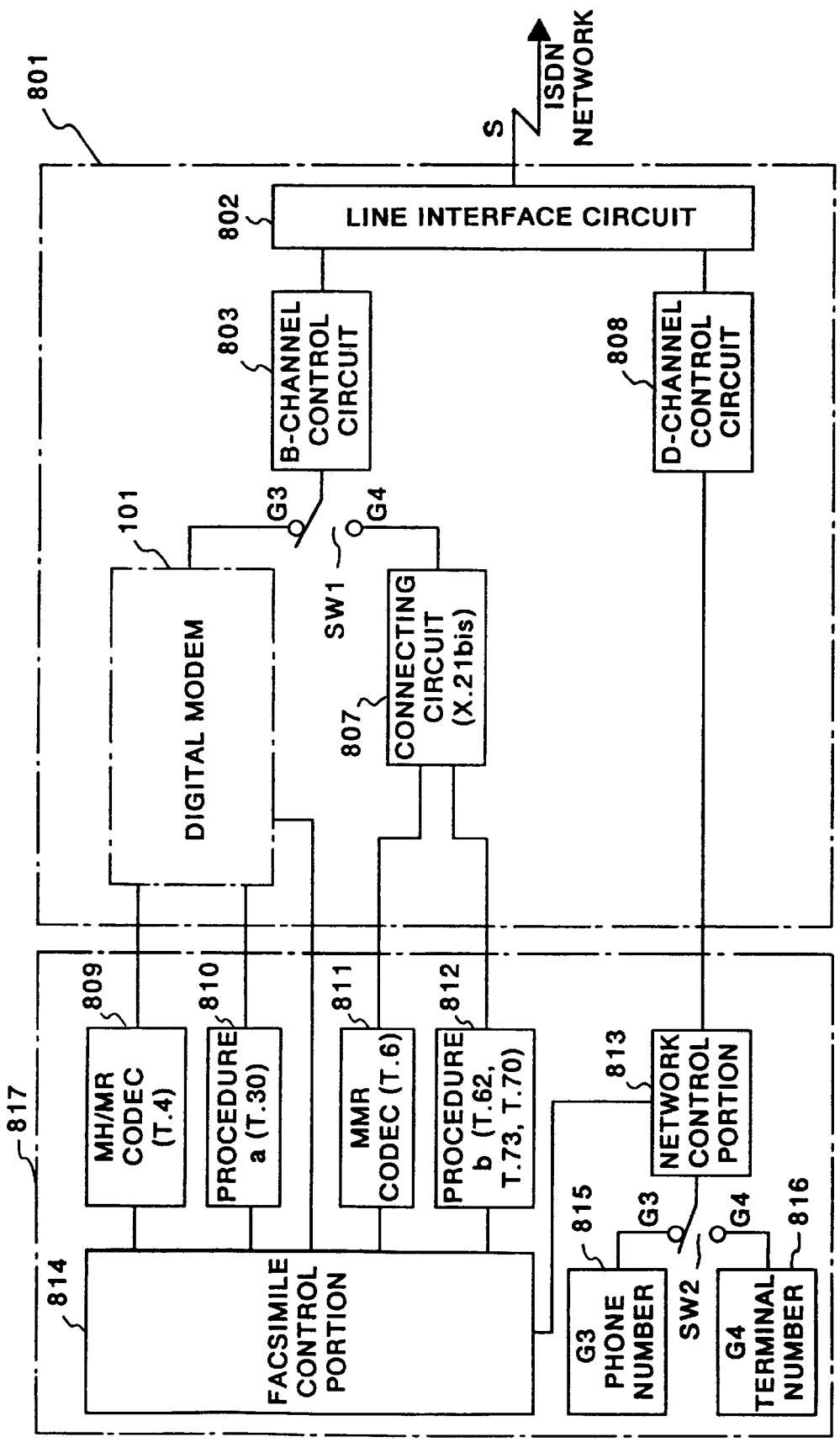
F I G. 12

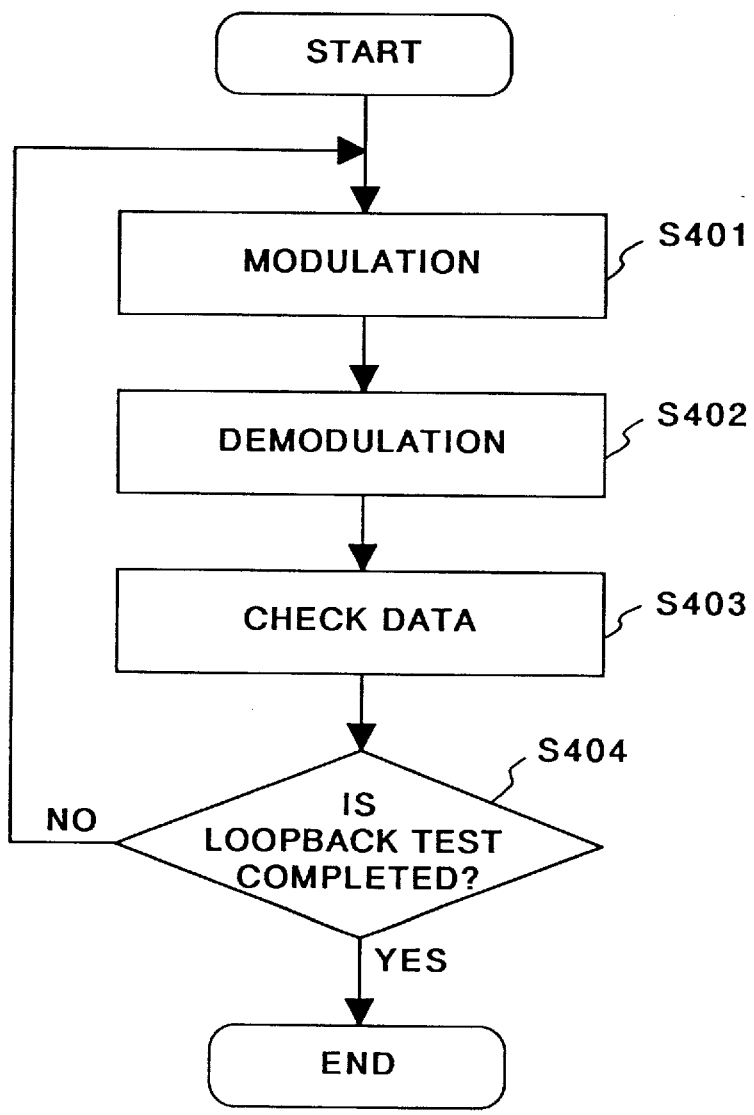
F I G. 15

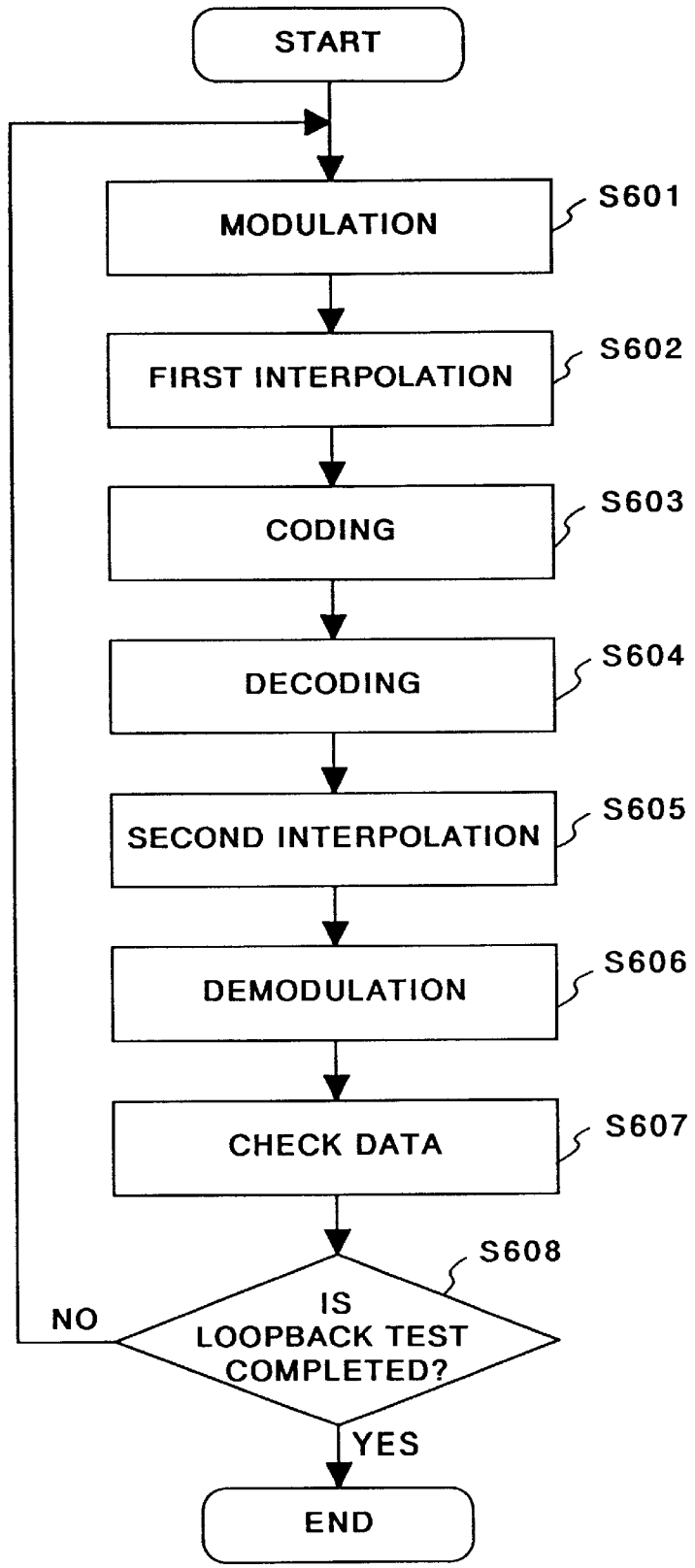
F I G. 17

DIGITAL COMMUNICATION DEVICE

BACKGROUND OF THE INVENTION

1. Field of the Invention

The present invention relates to a digital communication device for communicating a modulated signal through a digital line.

2. Description of the Related Art

A typical digital modem for performing modem/voice codec processes is mounted in a communication control unit for a facsimile having G3/G4 functions connected to a digital line. The communication control unit of the G3/G4 facsimile is constructed as shown in FIG. 9. Referring to FIG. 9, numeral 817 denotes a processing section having G3/G4 functions. On the other hand, numeral 801 denotes a communication control section.

In this example, an Integrated Services Digital Network (ISDN) is used as a digital line, and a part corresponding to the subscriber's line is, herein, expressed as a S interface.

A facsimile communication operation of the communication control unit according to the prior art will now be described.

First, the case in which the communication control unit functions as a G4 facsimile will be explained. In this case, it is assumed that switches SW1 and SW2 shown in FIG. 9 each are connected (turned ON) to the side of G4.

In the above processing section 817, a facsimile control portion 814 executes various kinds of control operations in order to make the whole unit function as a facsimile. The facsimile control portion 814 operates a network control portion 813 and carries out a call-out procedure or a call-in procedure by using a G4 terminal number 816, previous to facsimile transmission. In the ISDN, these procedures are carried out by using a D channel, and thus the network control portion 813 is connected to the S interface through a D channel control circuit 808 and a line interface circuit 802. After the connection of the unit to the network is thus completed, facsimile transmission is started.

The facsimile control portion 814 carries out a procedure b 812 previous to image transmission. The procedure b 812 is a G4 communication procedure according to T. 62, T. 73 and T. 70 of the CCITT Recommendation.

These procedures are connected to the switch SW1 through a connecting circuit 807. The connecting circuit 807 is a connecting circuit for digital communication according to X. 21bis of the CCITT Recommendation. These procedures and the image transmission are normally executed by using a B channel in the ISDN, and thus the connecting circuit 807 is connected to the S interface through a B channel control circuit 803 and the line interface circuit 802.

Subsequently, when the connection is completed, the facsimile control portion 814 operates a MMR codec 811, thereby starting to transmit image data. The MMR codec 811 executes coding and decoding of image data according to T. 6 of the CCITT Recommendation, and compresses and expands the data.

A codec for executing coding/decoding processes according to T. 6 will be referred to as a Modified Modified READ (MMR) codec hereinafter. The image data is also generally transmitted by using the B channel in the ISDN, and thus the MMR codec 811 is connected to the S interface through the connecting circuit 807, the B-channel control circuit 803 and the line interface circuit 802.

Image transmission with the G4 facsimile function is carried out according to the above-mentioned operations.

The case in which the communication control unit functions as a G3 facsimile will now be described. In this case, it is assumed that the switches SW1 and SW2 shown in FIG. 9 are connected (turned ON) to G3.

First, the facsimile control portion 814 operates the network control portion 813 and carries out a call-out procedure or a call-in procedure by using a G3 phone number 815, previous to facsimile transmission. The G3 phone number 815 is actually the number of a digital telephone. When the procedures are completed through the network control portion 813, the D-channel control circuit 808 and the line interface circuit 802, a line of audio communication between a terminal of the subscriber and the other terminal is established.

Although not shown in FIG. 9, a voice call by a digital telephone through the B channel is possible in this state.

After the connection of the the terminal of the subscriber to the network and the other terminal is established, facsimile transmission is started.

The facsimile control portion 814 operates a procedure a 810 previous to image transmission. The procedure a 810 is a G3 and G2 communication control procedure according to T. 30 of the CCITT Recommendation. This communication procedure is carried out by analog signals (in the voice grade) through a modem 805. In the case of a conventional G3 facsimile, since its communication line is an analog line, communication is possible in this state.

However, in the ISDN, the analog signals are converted into digital signals through a voice codec 806 for a digital telephone, and audio communication is performed through the B-channel control circuit 803 and the line interface circuit 802. The modem 805 is a modem (V21) for a communication control procedure according to the CCITT Recommendation.

After carrying out the communication procedure with the other terminal, the facsimile control portion 814 operates a MH/MR codec 809 so as to start image transmission. The MH/MR codec 809 performs a G3 coding/decoding processes of image data according to T. 4 of the CCITT Recommendation and compresses and expands the image data.

The image data is converted into analog signals (in the voice grade) through the modem 805. The modem 805 is a modem (V27ter or V29) for G3 image transmission according to the CCITT Recommendation. These image signals are also connected to the S interface through the voice codec 806, the B-channel control circuit 803 and the line interface circuit 802 in the same manner as above.

Image transmission with the G3 facsimile function is performed according to the above-mentioned operations.

The components (the modem 805 and the voice codec 806) enclosed by the line 804 shown in FIG. 9 will now be described in detail with reference to FIG. 10.

The modem 805 performs modulation or demodulation on the basis of a digital operation, and executes D/A or A/D conversion in each sampling clock which is normally 9.6 KHz. The voice codec 806 is an audio PCM codec for converting analog signals in the voice grade into digital signals and performing compression coding, or performing the operations in reverse order, and generally executes A/D or D/A conversion and corresponding coding/decoding in each sampling clock which is 8.0 KHz.

In transmission, a digital transmit signal (a) is input to a modulation circuit 901, and modulated by a carrier frequency prescribed in the CCITT Recommendation. The digital output signal from the modulation circuit 901 is converted into an analog transmit signal (b) in the voice grade by a first D/A converter 902 and a first lowpass filter (LPF) 903. The signal (b) is input to the voice codec 806, and converted into a digital signal again by a first A/D converter 904, and furthermore, coded into an audio PCM transmission code (c) by a coding circuit 905 with reference to a voice companding code table 906 and output.

The first lowpass filter 903 and a second lowpass filter 909 remove harmonic noise included in analog signals output from the first D/A converter 902 and a second D/A converter 908.

Receiving operations will now be described.

As illustrated, an audio PCM receive code (d) is input to a decoding circuit 907 and decoded with reference to the voice companding code table 906. The decoded digital signal is converted into an analog signal (e) in the voice grade by the second D/A converter 908 and the second LPF 909. The analog signal (e) is input to a second A/D converter 910 in the modem 805 and converted into a digital signal again. Then, the digital signal is demodulated and output as a digital receive signal (f) by a demodulation circuit 911.

However, in the above prior art shown in FIG. 10, since the sampling frequency of the D/A and A/D converters 902 and 910 used in the modem 805 and the sampling frequency of the A/D and D/A converters 904 and 908 used in the voice codec 806 are different, the conversion, a digital signal 'an analog signal' a digital signal, is necessary between the modem 805 and the voice codec 806, thereby causing a quantitizing error which results in the deteriorated transmission ability.

Since both sampling frequencies of 9.6 KHz and 8.0 KHz are used, the modem 805 and the voice codec 806 constitutes an extremely large circuitry. It is necessary to design a LSI for the modem 805 and a LSI for the voice codec 806 as separate chips. This needs a wide space and increases costs.

Furthermore, since either of functions μ-law or A-law is only used as a PCM coding rule which is referred to in coding and decoding, it is necessary to prepare a codec according to the PCM coding rule used in an area where a data communication apparatus is installed. If the data communication apparatus is transferred to an area where a different PCM coding rule is used, inconveniently, it is necessary to replace the codec.

In addition, since a transmission processing system, such as modulation, demodulation and PCM/voice codec processing, cannot be checked for itself, it is not possible to easily determine a part of the transmission system where a failure occurred.

SUMMARY OF THE INVENTION

The present invention aims to solve the above problems. Therefore, an object of the present invention is to provide a digital communication device capable of digitally processing modem modulation and demodulation and voice codec processes.

Another object of the present invention is to provide a codec capable of selecting a PCM coding rule to be referred to in coding and decoding.

A further object of the present invention is to provide a modem capable of easily determining a part of a transmission processing system where a failure occurred.

Additional and other objects of the present invention will become apparent from the detailed description in conjunction with the accompanying drawings.

BRIEF DESCRIPTION OF THE DRAWINGS

FIG. 2 is a flowchart showing operations of a transmitting side in the embodiment;

FIG. 11 is a schematic block diagram showing the construction of a digital modem 101 according to a second embodiment;

FIG. 12 is a schematic block diagram showing the construction of a facsimile according to the second embodiment;

FIGS. 15 to 17 are flowcharts showing the procedures for loopback tests in the third embodiment.

DESCRIPTION OF THE PREFERRED EMBODIMENTS

A preferred embodiment of the present invention will now be described in detail with reference to the accompanying drawings.

[First Embodiment]

Figure 1:
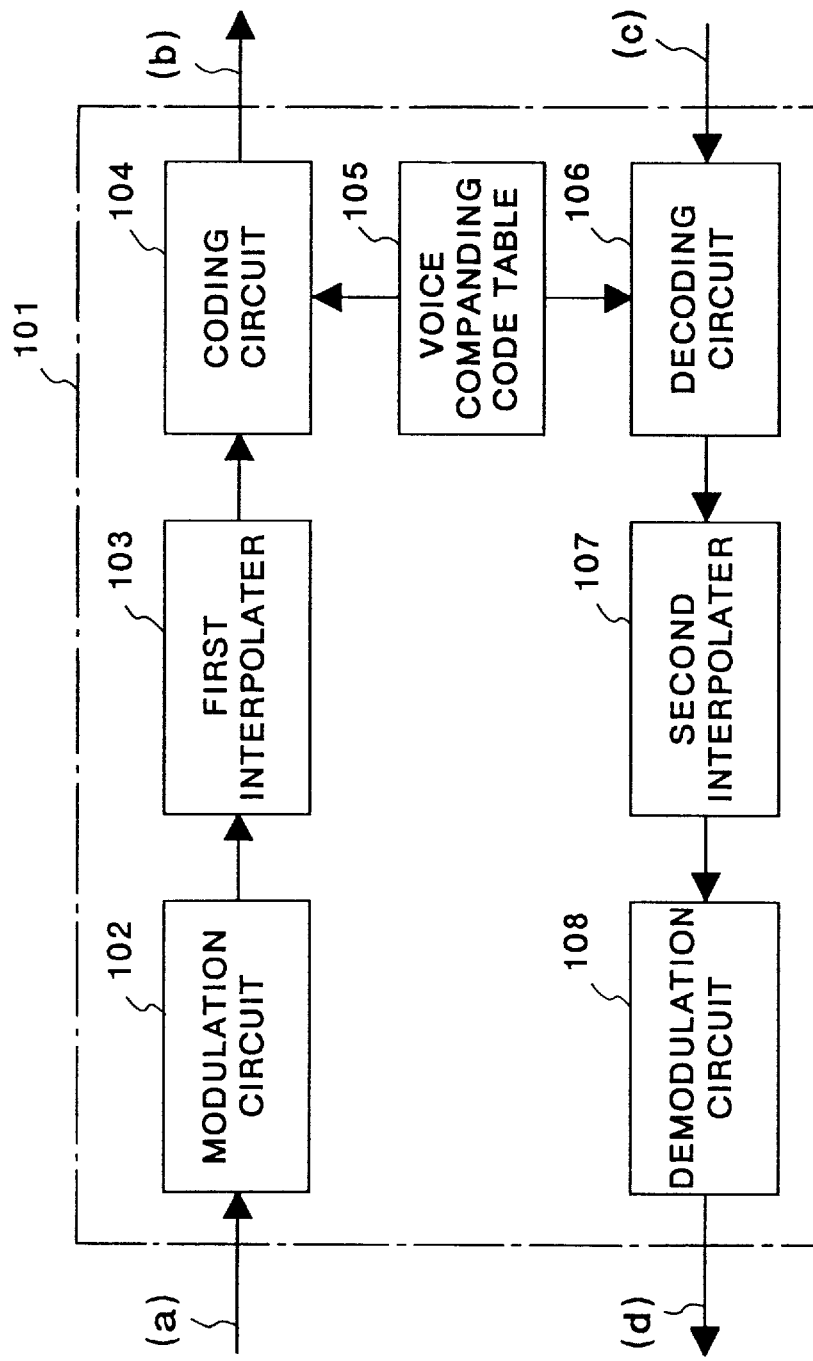
FIG. 1 is a schematic block diagram showing the construction of a digital modem 101 according to a first embodiment.

FIG. 1 is a schematic block diagram showing the construction of a digital modem (codec/modem) 101 according to a first embodiment.

Figure 8:
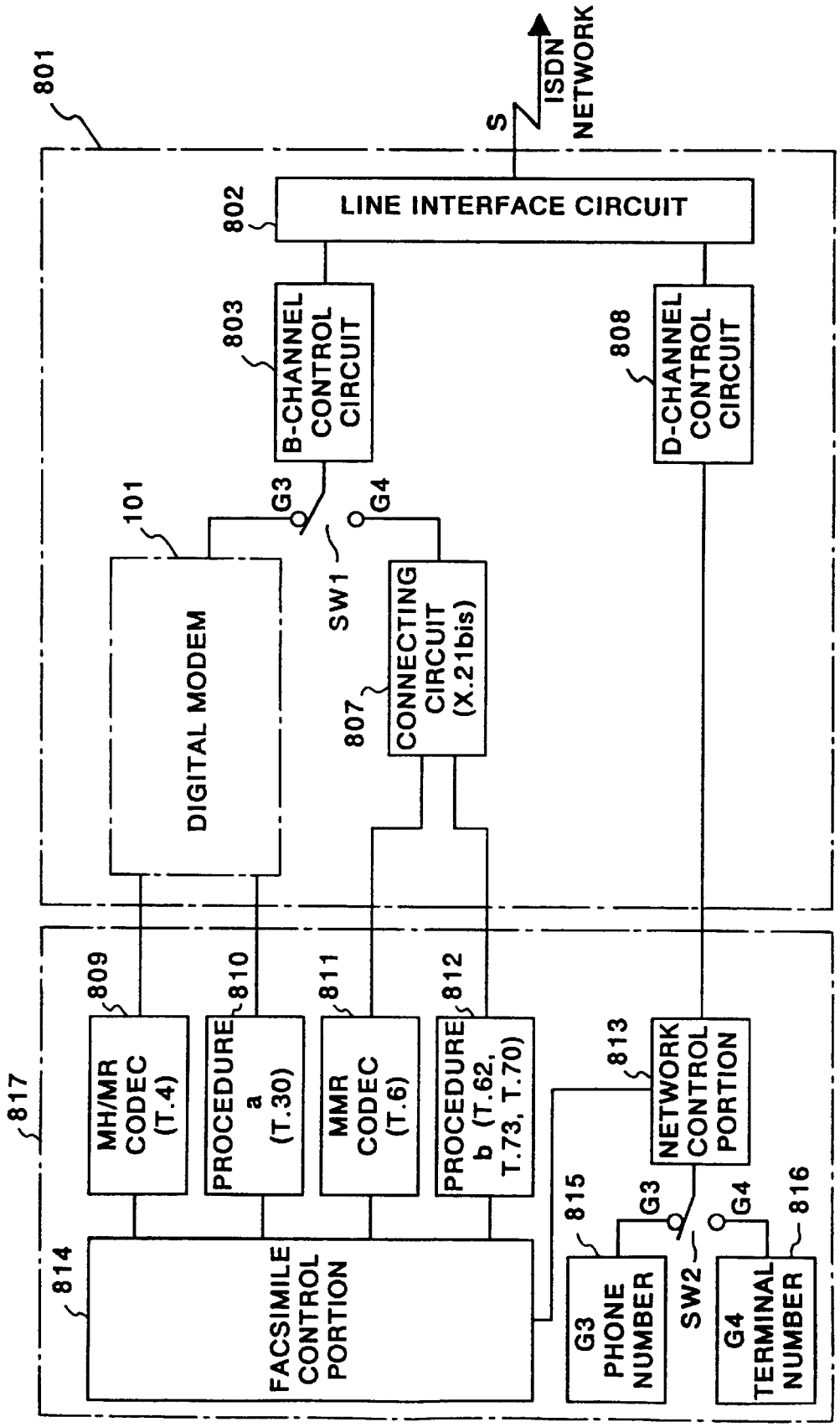
FIG. 8 is a schematic block diagram showing the construction of a facsimile according to the first embodiment.
Figure 9:
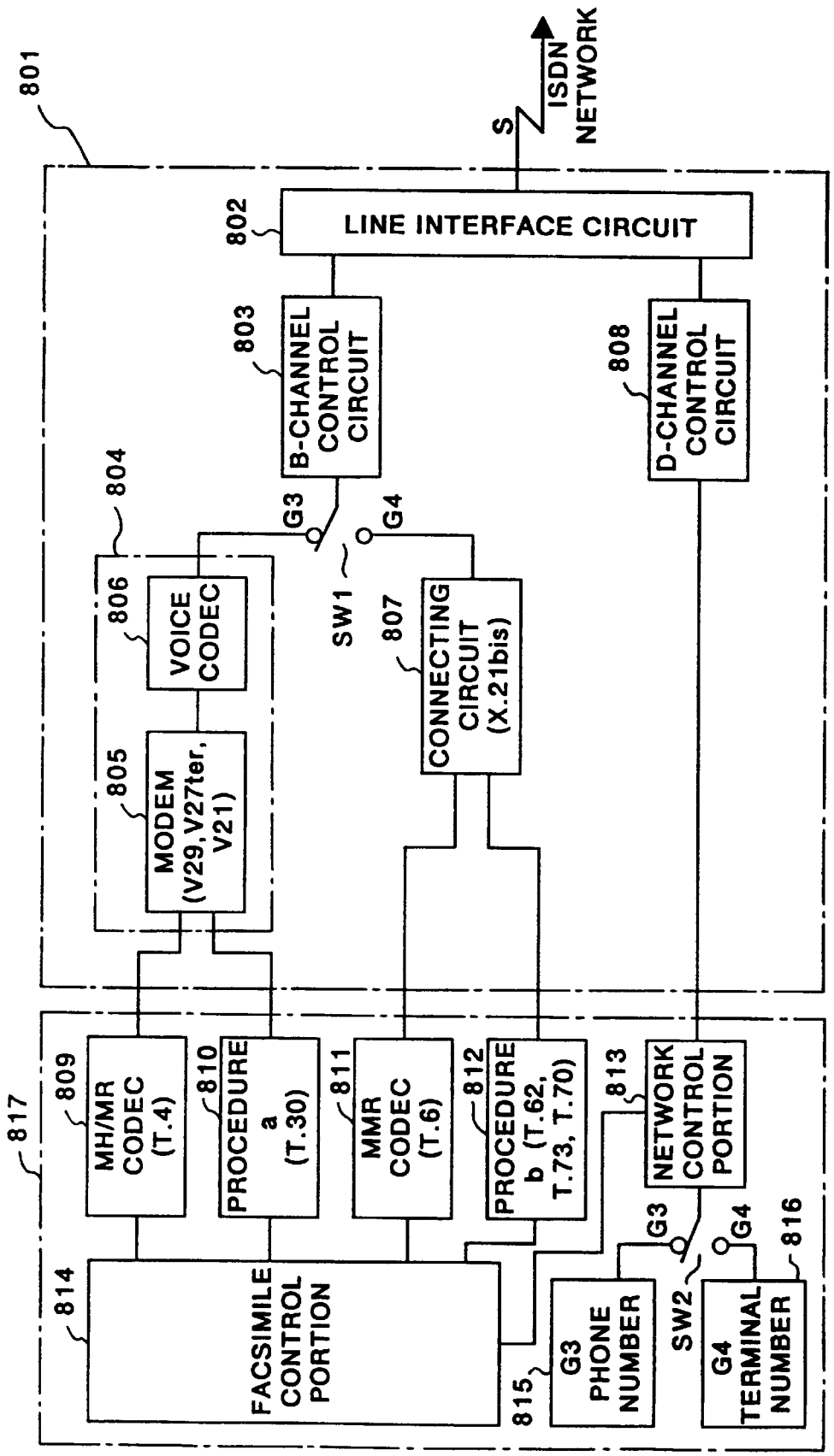
FIG. 9 is a schematic block diagram showing the construction of a communication control unit for a conventional facsimile.

FIG. 8 is a schematic block diagram showing the construction of a facsimile according to the first embodiment.

Figure 10:
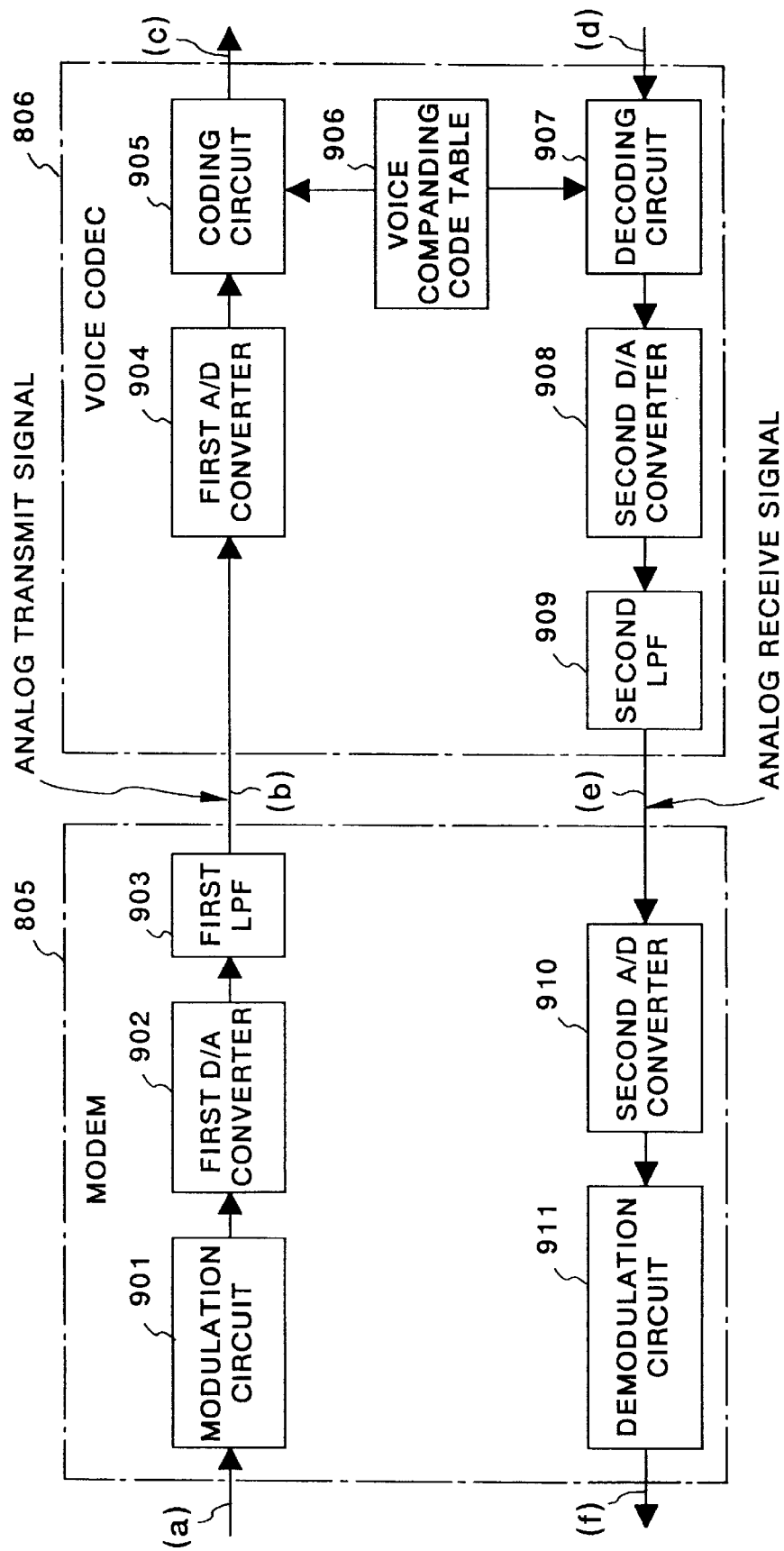
FIG. 10 is a detailed block diagram showing the constructions of a modem and a voice codec shown in FIG. 9.

As illustrated, in this embodiment, the D/A and A/D converters in the modem and the D/A and A/D converters in the voice codec are removed from the conventional modem/voice codec processing basic composition shown in FIG. 10, the LPF in the modem and the LPF in the voice codec, which are unnecessary due to the removal of the above converters, are also taken away, and interpolaters 103 and 107 are substituted for the converters and the LPFs.

In the above construction, when a transmission operation is performed, a digital transmit signal (a) input to a modulation circuit 102 is modulated by a carrier frequency prescribed according to the CCITT Recommendation. The modulated output signal is a digital signal, and output in each sampling clock which is normally 9.6 KHz. The output signal is input to a first interpolater 103 and sampled by a sampling clock of 8.0 KHz. In other words, the sampling conversion from 9.6 KHz to 8.0 KHz is carried out. The converted signal is furthermore input to a coding circuit 104, converted to an audio PCM transmission code (b) with reference to a voice companding code table 105, and output in a sampling clock of 8.0 KHz.

A receiving operation will now be described.

An input audio PCM receive code (c) is decoded by a decoding circuit 106 with reference to the voice companding code table 105. The decoded digital signal is output in the sampling clock of 8.0 KHz. Then, the output signal is input to a second interpolater 107 and sampled by a sampling clock which is normally 9.6 KHz. In other words, the sampling conversion from 8.0 KHz to 9.6 KHz is carried out. The converted signal is furthermore demodulated by a demodulation circuit 108 and output as a digital receive signal (d) in a sampling clock of 9.6 KHz.

Operations of a transmitting side of the digital modem 101 according this embodiment will be described with reference to the flowchart shown in FIG. 2.

The case that a V27ter modem is used and the transmission rate is 4800 bps is given as an example.

The modulation circuit 102 shown in FIG. 1 repeats processes in each transmit data symbol (1/1600"). Therefore, one transmit data symbol (=3 bit) is read from a transmitting facsimile (FAX) in Step S200 shown in FIG. 2, and demodulation for a symbol cycle (1/1600") is conducted on the data by a basic frequency having a cycle of 1/9600" in Step S201. In other words, six (=1/1600÷1/9600) modulation results can be obtained by executing processing by the basic frequency having a cycle of 1/9600" for 1/1600"

In Step S202, the six modulation results are temporarily saved in an unillustrated buffer in preparation for the subsequent interpolation. Then, in Step S203, the interpolation using the saved six data is performed by the first interpolater 103, the conversion of the sampling frequency from 9.6 KHz to 8.0 KHz is achieved. This sampling frequency conversion can be performed by conducting interpolation by using the six data in a symbol interval (=1/1600"), obtaining five interpolation results, and sampling the results at regular intervals (1/8000=1/1600÷5).

When the above interpolation is completed, the interpolation results are temporarily saved in Step S204 in preparation for the subsequent PCM coding. The coding circuit 104 performs coding according to G. 711 of the CCITT Recommendation in Step S205, and a PCM code is output in Step S206.

The above-mentioned processes in Steps S200 to S206 are repeated in each symbol interval (1/1600").

The above interpolation will now be described in detail with reference to FIGS. 4 and 5.

Figure 4:
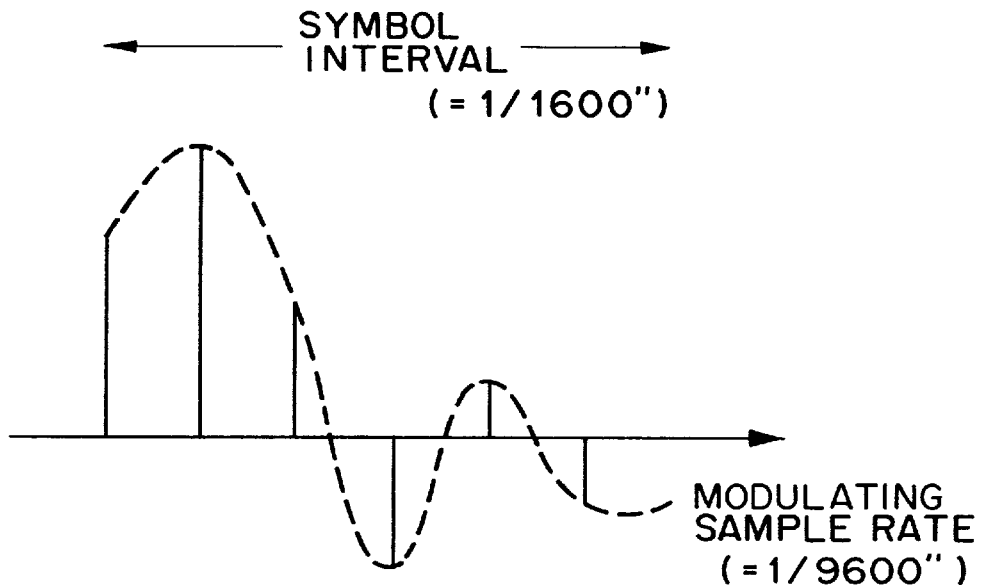
FIGS. 4 and 5 are views explaining processing of a first interpolater.

FIG. 4 shows a discrete modulation waveform obtained by the process in Step S201 shown in FIG. 2, and a dotted line expresses an envelope. As shown in FIG. 4, six discrete data are arranged at regular intervals (=1/9600") in a symbol interval (=1/1600"), and the envelope expressed in the dotted line can be formed by performing interpolation processing based on the six data.

Figure 5:
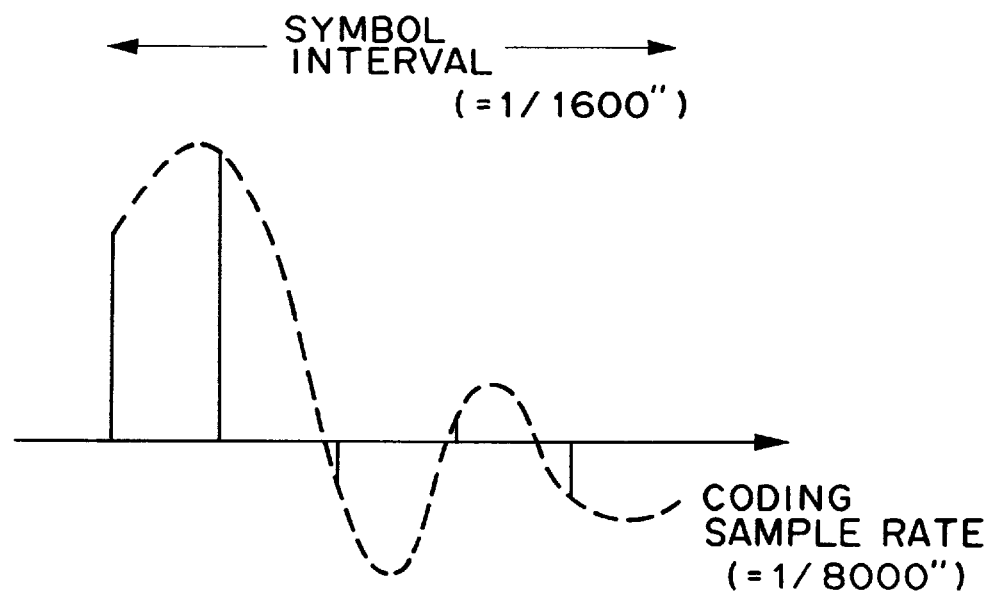

FIG. 5 shows that five discrete data are arranged at regular intervals (=1/8000") in a symbol interval (=1/1600") after the sampling frequency conversion from 9.6 KHz to 8.0 KHz. The five data arranged at regular intervals are obtained by calculating values of an envelope at intervals of 1/8000".

Operations of a receiving side of the digital modem 101 in this embodiment will now be described with reference to the flowchart shown in FIG. 3.

The processes are repeated in each receive data symbol (1/1600") on the receiving side in the same manner as in the transmitting side. Therefore, one receive data symbol, that is, five PCM codes (=1/1600÷1/8000) are input in Step S300 shown in FIG. 3. Subsequently, the decoding circuit 106 decodes the input five PCM codes according to G. 711 of the CCITT Recommendation in Step S301. Then, in Step S302, the decoded results are temporarily saved in preparation for the subsequent interpolation.

Next, interpolation using the saved five data is executed by the second interpolater 107 in Step S303, and the sampling frequency conversion from 8.0 KHz to 9.6 KHz is achieved. This sampling conversion can be carried out by performing interpolation based on the five data in the symbol interval (=1/1600"), obtaining six interpolation results, and sampling the results at regular intervals (1/1600÷6=1/9600).

When the above interpolation is completed, the interpolation results are temporarily saved in Step S304 in preparation for the subsequent demodulation. In Step S305, the six interpolation results are demodulated by the demodulation circuit 108 in a symbol cycle (1/1600") by a basic frequency having a cycle of 1/9600". Then, one symbol data (=3 bit) is obtained as a result and output to the FAX in Step S306.

The above interpolation on the receiving side will be explained with reference to FIGS. 6 and 7.

Figure 3:
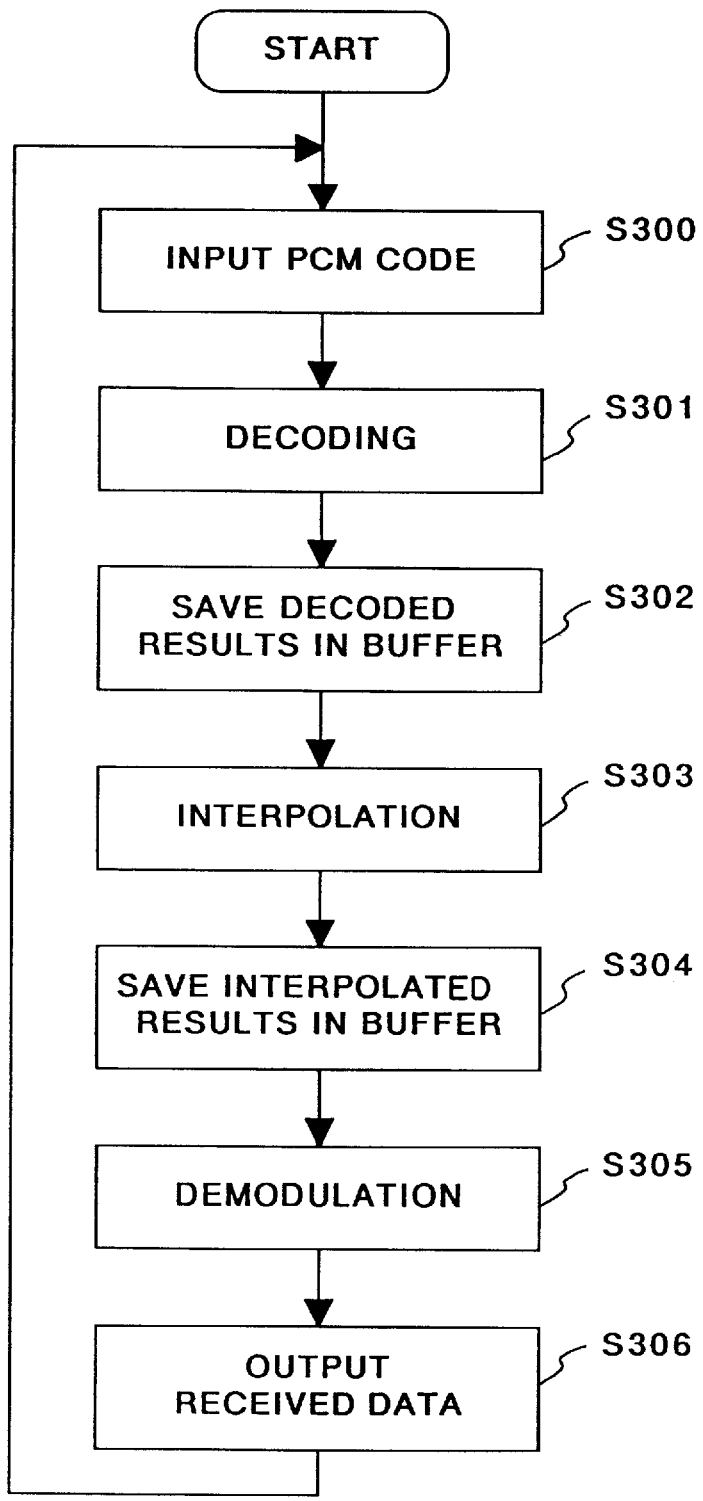
FIG. 3 is a flowchart showing operations of a receiving side in the embodiment.
Figure 6:
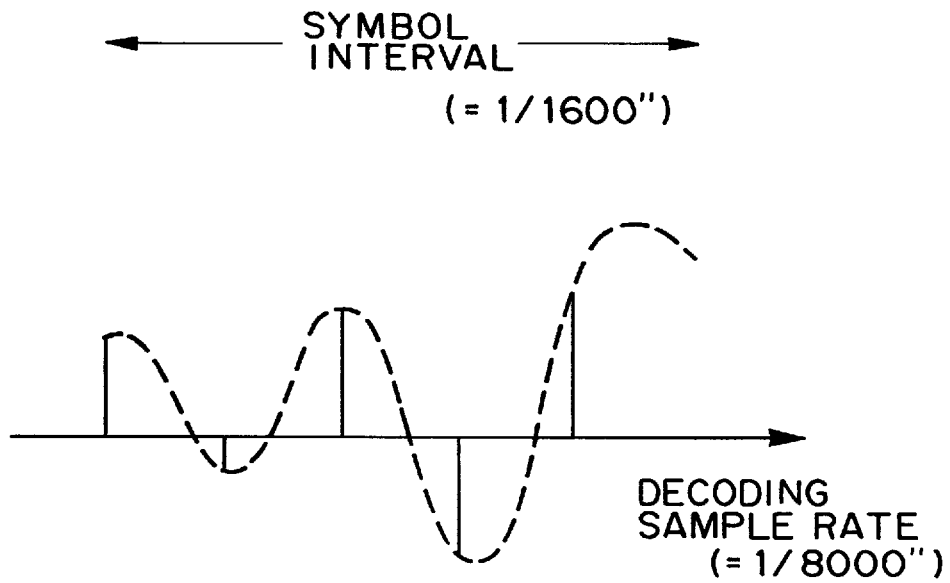
FIGS. 6 and 7 are views explaining processing of a second interpolater.

FIG. 6 shows a discrete receive waveform obtained by the process in Step S301 shown in FIG. 3, and a dotted line expresses an envelope. As shown in FIG. 6, five discrete data are arranged at regular intervals (=1/8000") in a symbol interval (=1/1600"). The envelope expressed in the dotted line can be formed by interpolation based on the five data.

Figure 7:
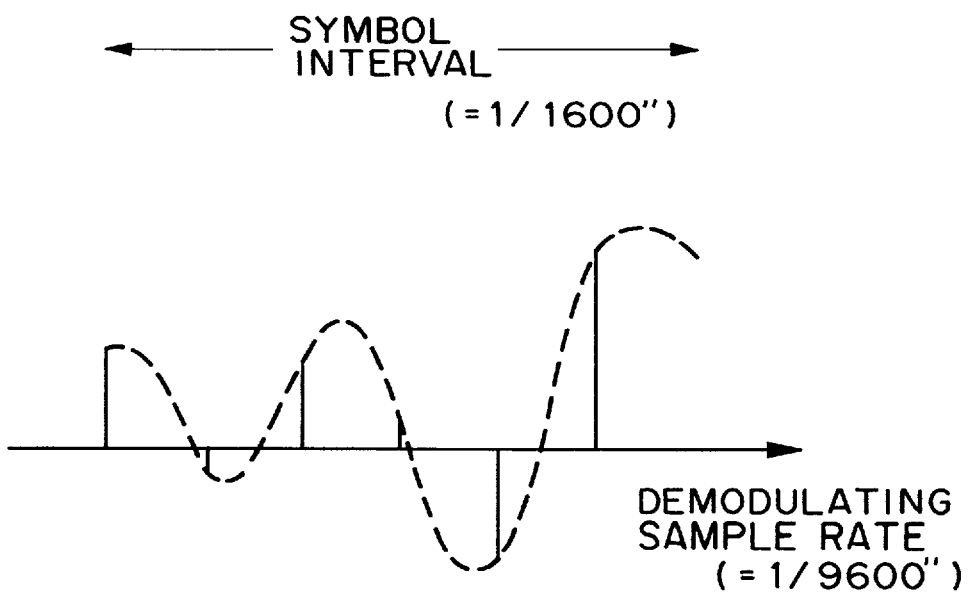

FIG. 7 shows that six discrete data are arranged at regular intervals (=1/9600") in a symbol interval (=1/1600") after the sampling frequency conversion from 8.0 KHz to 9.6 KHz. The six data arranged at regular intervals are obtained by calculating values of the envelope at intervals of 1/9600".

As described above, according to this embodiment, the following effects can be obtained by digitally performing the modem/PCM codec processing.

The A/D and D/A converters mounted in the modem which normally operate at a sample rate of 9.6 KHz and the A/D and D/A converters mounted in the PCM codec which normally operate at a sample rate of 8.0 KHz are taken away from the conventional communication control unit, the LPF in the modem and the LPF in the PCM codec are also taken away, and a sample rate conversion processing circuit is disposed between the modem and the PCM codec instead of the above converters and the LPFs. It is thereby possible to digitally achieve the modem modulation/demodulation processing and the PCM codec processing, and thus to reduce the quantitizing errors.

Furthermore, since two sets of A/D and D/A converters and two LPFs can be removed, the size of the circuit is made small and costs are lowered. In addition, it is easy to merge the modem and the PCM codec into a chip instead of the conventional composition of the modem, the PCM code, and the LSIs, and thus it can be greatly expected to save the space.

As described above, according to this embodiment, it is possible to provide a digital modem 101 having a simple structure and capable of preventing quantitizing errors by digitally executing the modem modulation/demodulation and the voice codec processing.

[Second Embodiment]

A second embodiment of the present invention will now be described with reference to the accompanying drawings.

FIG. 11 is a schematic block diagram showing the construction of a digital modem 101 according to the second embodiment.

FIG. 12 is a schematic block diagram showing the construction of a facsimile according to the second embodiment.

As illustrated, in this embodiment, the D/A and A/D converters in the modem and the D/A and A/D converters in the voice codec are removed from the conventional modem/voice codec processing basic composition shown in FIG. 10, the LPF in the modem and the LPF in the voice codec, which are unnecessary due to the removal of the above converters, are also taken away, and interpolaters 103 and 107 are substituted for the converters and LPFs. Either μ-law or A-law can be selected by a control line (e) as a PCM coding rule which is referred to in coding and decoding.

In the above construction, when a transmission operation is performed, a digital transmit signal (a) input to a modulation circuit 102 is modulated by a carrier frequency prescribed according to the CCITT Recommendation. The modulated output signal is a digital signal, and output in each sampling clock which is normally 9.6 KHz. The output signal is input to a first interpolater 103 and sampled by a sampling clock of 8.0 KHz. In other words, the sampling conversion from 9.6 KHz to 8.0 KHz is carried out. The converted signal is furthermore input to a coding circuit 104, converted to an audio PCM transmission code (b) with reference to a memory 105a in which an A-law voice companding/expanded code table is stored or a memory 105b in which a μ-law voice companding/expanded code table is stored, either which is selected beforehand by an interlock switch SW, and output.

A receiving operation will now be described.

An input audio PCM receive signal (c) is decoded by a decoding circuit 106 with reference to either the A-law voice companding/expanded code table 105a or the μ-law voice companding/expanded code table 105b which is selected by the interlock switch SW. The decoded digital signal is output in a sampling clock of 8.0 KHz. Then, the output signal is input to a second interpolater 107 and sampled by a sampling clock which is normally 9.6 KHz.

In other words, the sampling conversion from 8.0 KHz to 9.6 KHz is carried out. The converted signal is furthermore demodulated by a demodulation circuit 108 and output as a digital receive signal (d).

Therefore, it is possible to cope with both A-law and μ-law by allowing the PCM coding rule to be selected by the interlock switch SW.

Although the PCM coding rule is selected according to the control from the facsimile control portion 814 in the above embodiment, it is also possible to select the PCM coding rule by another method, for example, by turning on and off a bit switch disposed in the communication control unit.

As described above, according to this embodiment, since the modem modulation/demodulation and the voice codec processing can be digitally processed and a PCM coding rule to be referred to in coding and decoding can be selected, it is possible to simplify the structure of the digital modem 101, to prevent quantitizing errors, and to enhance the convenience of the digital modem 101

[Third Embodiment]

A third embodiment of the present invention will be described with reference to the drawings.

Figure 13:
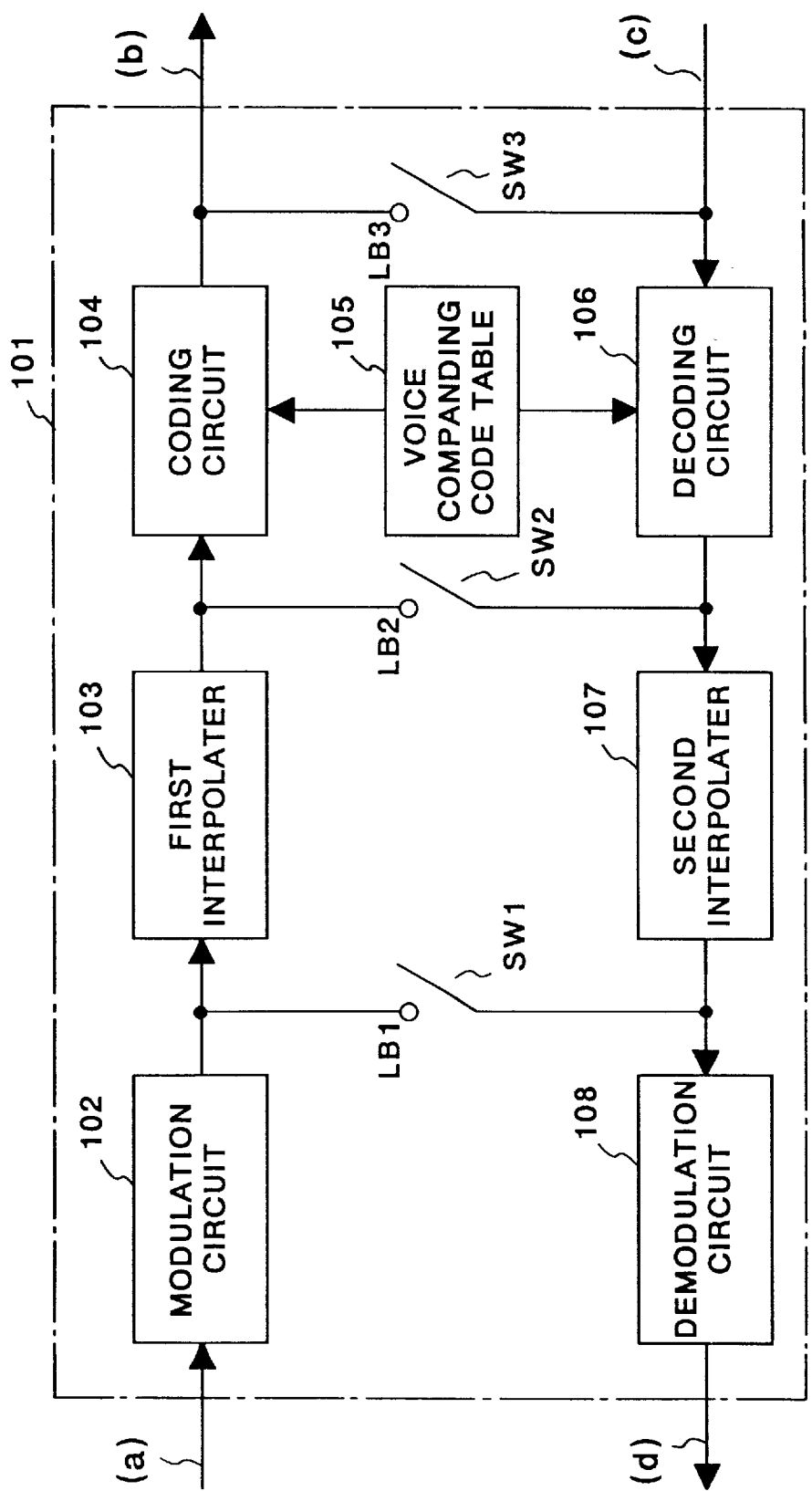
FIG. 13 is a schematic block diagram showing the construction of a digital modem 101 according to a third embodiment.

FIG. 13 is a schematic block diagram showing the construction of a digital modem 101 according to the third embodiment.

Figure 14:
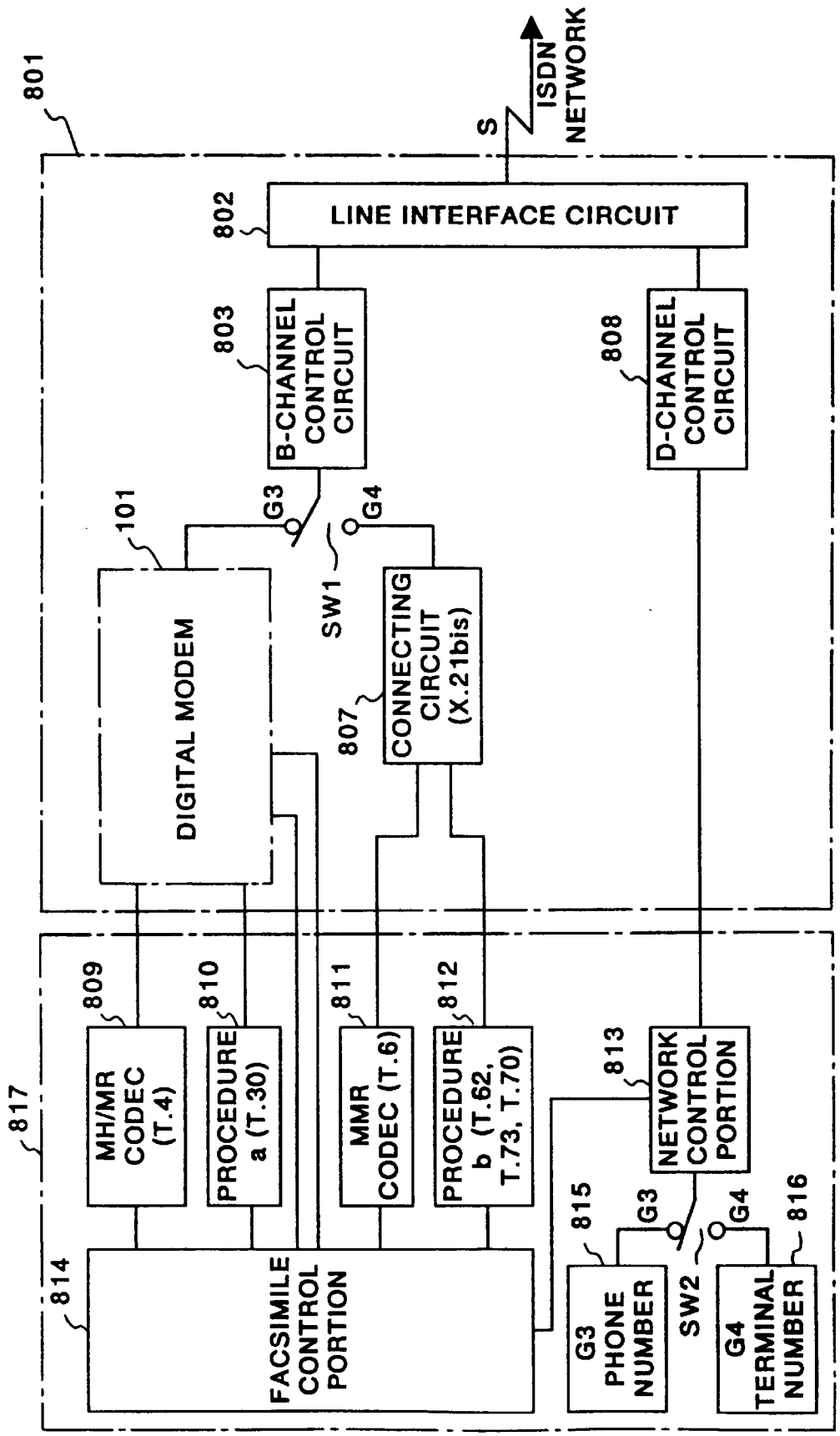
FIG. 14 is a schematic block diagram showing the construction of a facsimile according to the third embodiment.

FIG. 14 is a schematic block diagram showing the construction of a facsimile according to the third embodiment.

As illustrated, in this embodiment, the D/A and A/D converters in the modem and the D/A and A/D converters in the voice codec are removed from the conventional modem/voice codec processing basic composition shown in FIG. 10, the LPF in the modem and the LPF in the voice codec, which are unnecessary due to the removal of the above converters, are also taken away, and interpolaters 103 and 107 are substituted for the converters and the LPFs. Furthermore, a switch SW1 is disposed between the output of the modulator and the input of the demodulator, a switch SW2 is disposed between the output of the first interpolater and the input of the second interpolater, and a switch SW3 is disposed between the output of the coding circuit and the input of the decoding circuit.

The switches SW1 to SW3 shown in FIG. 13 are controlled by the facsimile control portion 814.

Transmitting and receiving operations in the above construction are the same as those in the above first embodiment, and therefore, the description of the operations is omitted.

All of the above switches SW1 to SW3 are in the off state.

The procedures for loopback tests which are made by short-circuiting by the above switches paths for transmission and receiving of the digital modem 101 in this embodiment will now be described.

First, a loopback test on the modulation circuit 102 and the demodulation circuit 108 shown in FIG. 13 will be explained according to the flowchart shown in FIG. 15.

In this case, it is assumed that only the switch SW1 is on and the other switches SW2 and SW3 are off.

In Step S401, data generated inside the modulation circuit 102 or transmit data from the FAX is modulated by the modulation circuit 102. The modulated data is demodulated by the demodulation circuit 108 in Step S402, thereby restoring the transmit data. It is checked by the facsimile control portion 814 in Step S403 whether or not the transmitted data and the restored data are the same, and the check result is output to an display 820 and the like. Then, it is determined by the facsimile control portion 814 in Step S404 whether or not the above process is executed a predetermined number of times. If the process is not executed a predetermined number of times, Step S401 is executed again and the above checking operations are repeated.

According to the above process, if no error is found in the above step S403, it is possible to determine that modulation and demodulation are normally performed.

A loopback test on the modulation circuit 102, the first interpolater 103, the second interpolater 107 and the demodulation circuit 108 will now be described according to the flowchart shown in FIG. 16.

In this case, it is assumed that only the switch SW2 is on and the other switches SW1 and SW3 are off.

Data generated inside the modulation circuit 102 or transmit data from the facsimile cntrol portion 814 is modulated by the modulation circuit 102 in Step S501. Interpolation is performed by the first interpolater 103 in Step S502, and the sampling frequency conversion from 9.6 KHz to 8.0 KHz is executed. Then, interpolation is performed by the second interpolater 107 in Step S503, and the sampling frequency conversion from 8.0 KHz to 9.6 KHz is executed in preparation for subsequent demodulation.

In Step S504, the transmit data is demodulated by the demodulation circuit 108 based on data whose sampling frequency is returned to 9.6 KHz. It is checked by the facsimile control portion 814 in Step S505 whether or not the transmitted data and the restored data are the same. As a result, if no error is found, it is possible to determine that the modulation, the demodulation and the first and second interpolations are normally executed. In Step S506, it is determined whether by the facsimile control portion 814 or not a series of processes are performed a predetermined number of times. If the processes are not performed a predetermined number of times, Step S501 is executed again and the above processes are repeated.

Finally, a loopback test on the whole transmission processing system in this embodiment will be described according to the flowchart shown in FIG. 17.

In this case, it is assumed that only the switch SW3 is on and the other switches SW1 and SW2 are off.

Data generated inside the modulation circuit 102 or transmit data from the facsimile control portion 814 is modulated by the modulation circuit 102 in Step S601. Interpolation is performed by the first interpolater 103 in Step S602, and the sampling frequency conversion from 9.6 KHz to 8.0 KHz is carried out. In Step S603, coding is performed by the coding circuit 104 so as to convert the modulated data to a PCM transmission code. The PCM transmission code is decoded by the decoding circuit 106 in Step S604. In Step S605, interpolation is performed by the second interpolater 107 so that the decoded data can be demodulated. In other words, the sampling frequency conversion from 8.0 KHz to 9.6 KHz is carried out.

The interpolation result is demodulated by the demodulation circuit 108 in Step S606, and the transmitted data is restored. The restored transmit data is compared with actually transmit data by the facsimile control portion 814 in Step S607 and it is checked whether or not both the data are the same. As a result, if no error is found, it is possible to determine that the modulation, the demodulation, the first and second interpolations, the coding and the decoding are normally executed.

In Step S608, it is determined by the facsimile control portion 814 whether or not the above series of processes are performed a predetermined number of times. If the processes are not performed a predetermined number of times, Step S601 is executed again and the above processes are repeated.

Figure 16:
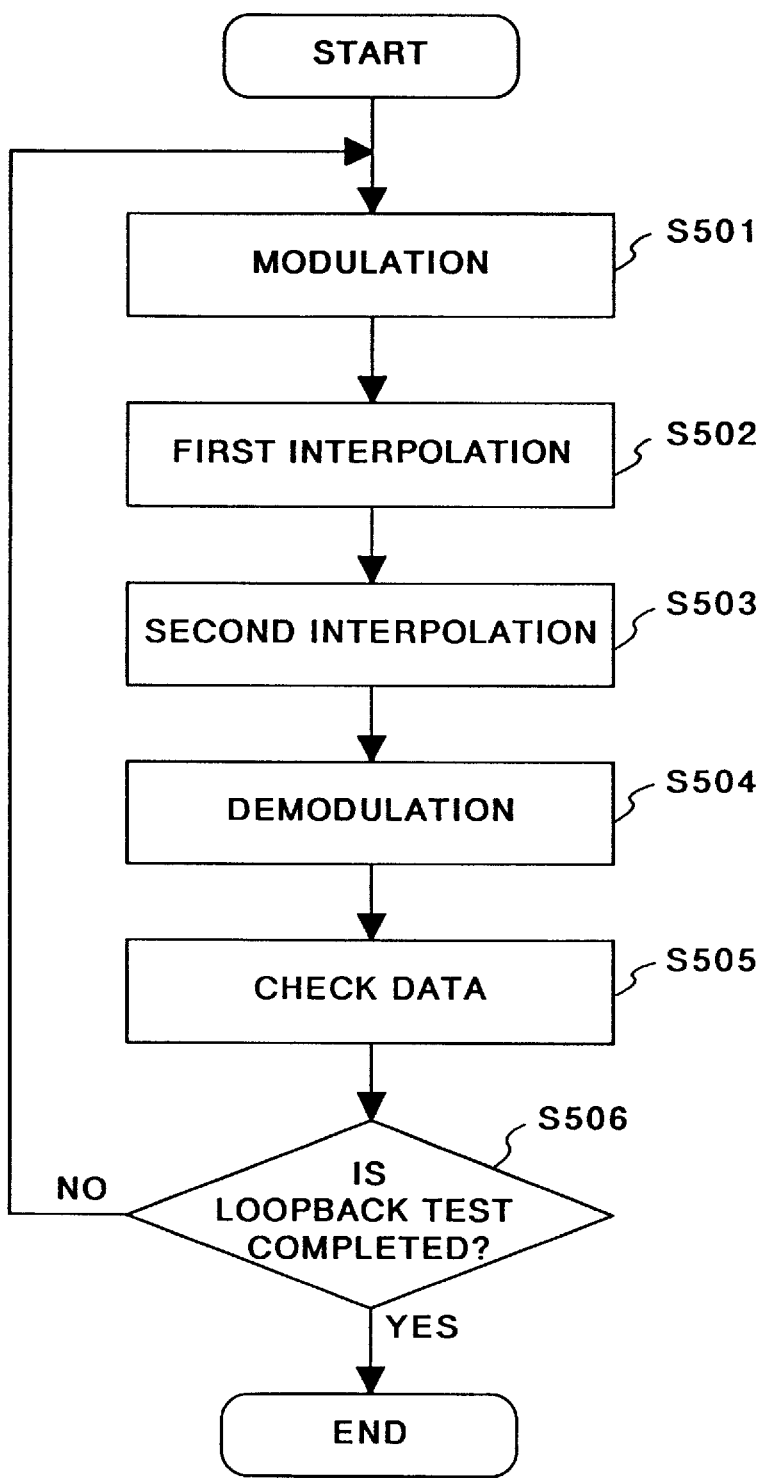

As described above, it is possible to easily determine a part of the digital modem 101 where a failure occurred by executing the loopback tests according to FIGS. 15 to 17 in this order. In other words, for example, if the digital modem 101 passes the loopback tests according to FIGS. 15 and 16 and does not pass the loopback test according to FIG. 17, it is possible to assume that a failure occurred in the PCM coding circuit 104 or the PCM decoding circuit 106.

Self-checking of the transmission processing system, such as modulation and demodulation processing and PCM/voice codec processing, is made possible by mounting a plurality of paths for short-circuiting transmitting and receiving paths (loopback function), and thus, it is possible to easily determine a part where a failure occurred.

As described above, according to this embodiment, since the modem modulation and demodulation and the voice codec processing can be digitally carried out and a part of the transmission processing system where a failure occurred can be easily determined, it is possible to simplify the structure of the digital modem 101, to prevent quantitizing errors, and to enhance the convenience of the digital modem 101.

[Other Embodiments]

Although the sampling frequencies for modulation/demodulation and for the PCM codec processing are set at 9.6 KHz and 8.0 KHz, respectively, the sampling frequencies of the present invention are not limited to these values.

Furthermore, although the case in which a V27ter modem is used and the transmission rate is 4800 bps is described, it is obvious that the present invention can be easily applied to other modems.

Although a simple interpolation is performed as sampling frequency conversion, the same effect can be obtained even by using splined interpolation, interpolation with a polynomial, or the like. The interpolation of the present invention is not limited to the above interpolating methods.

In addition, although the description is given with a consciousness that the sampling frequency conversion is realized by DSP, the realization of the conversion in the present invention is not limited to the realization by hardware and software.

The present invention is applicable to a modulating device without any demodulating function and a demodulating device without any modulating function, besides a modem having both modulating and demodulating functions.

The present invention is also applicable to a simple coding circuit and a simple decoding circuit.

While the present invention is described in conjunction with preferred embodiments, it will be apparent that the present invention is not limited to the above-mentioned embodiments and that various changes and modifications thereof can be made without departing from the spirit and scope of the invention as defined in the appended claims.

What is claimed is:

1. A modulation device for outputting digital data representing a modulated signal to a digital transmission path, said modulation device comprising:

first conversion means for performing a modulation process by converting input signals into first digital signals representing the modulated signal and outputting said first digital signals at first intervals, said first intervals being predetermined for performing the modulation process; and second conversion means for converting said first digital signals, input at said first intervals, into second digital signals representing the modulated signal at second intervals which are different from said first intervals and which correspond to a sampling frequency of the digital transmission path, and outputting said second digital signals at said second intervals to the digital transmission path.

2. A modulation device according to claim 1, wherein said first conversion means sequentially converts said input signals input at the first intervals into said first digital signals.

3. A modulation device according to claim 1, wherein said second conversion means converts said first digital signals input at said first intervals into said second digital signals at said second intervals by interpolation.

4. A modulation device according to claim 1, wherein said second intervals are equal to intervals between sampling clocks of said digital transmission path.

5. A modulation device according to claim 1, wherein said first intervals are shorter than said second intervals.

6. A demodulation device for demodulating data representing a modulated signal received from a digital transmission path and decoded by a decoding circuit, said demodulation device comprising:

conversion means for converting the data representing the modulated signal input at first intervals from the digital transmission path into converted data representing the modulated signal at second intervals different from said first intervals, said first intervals corresponding to a sampling frequency of the digital transmission path; and processing means for performing demodulation based on said converted data at said second intervals.

7. A demodulation device according to claim 6, wherein said first intervals are equal to intervals between sampling clocks of said decoding circuit.

8. A demodulation device according to claim 6, wherein said conversion means converts said decoded data input at said first intervals into said converted data at said second intervals by interpolation.

9. A demodulation device according to claim 6, wherein said second intervals are shorter than said first intervals.

10. A digital communication device connected to a digital network for performing modem and voice code processing, comprising:

a transmitting section comprising:
modulation means for outputting first signals representing a first modulated signal using a modulation process;
first conversion means for converting the first digital signals inputted at a first frequency, which is predetermined for the modulation process used by the modulation means, to second digital signals representing the modulated signal sampled at a sampling frequency of the digital network;
coding means for coding the second digital signals converted by said first conversion means; and
means for outputting the coded second digital signals to the digital network; and a receiving section comprising:
means for receiving, from the digital network, coded third digital signals representing a second modulated signal;
decoding means for decoding the coded third digital signals;
second conversion means for converting the third digital signals representing the second modulated signal decoded by said decoding means at the sampling frequency of the digital network into fourth digital signals representing the second modulated signal at the first frequency; and
demodulation means for demodulating the fourth digital signals converted by said second conversion means.

11. A digital communication device according to claim 10, wherein said first conversion means outputs the first digital signals, which have been input from said modulation means in each of a first sampling clock, in each of a second sampling clock.

12. A digital communication device according to claim 10, wherein said second conversion means outputs the fourth digital signals, which have been input from said decoding means in each of a second sampling clock, in each of a first sampling clock.

13. A modulation device according to claim 1, wherein the second intervals are intervals sampling at a sampling clock of 8.0 KHz.

14. A modulation device according to claim 13, wherein the first intervals are intervals sampling at a sampling clock of 9.6 KHz.

15. A demodulation according to claim 6, wherein the first intervals are intervals sampling at a sampling clock of 8.0 KHz.

16. A demodulation according to claim 15, wherein the second intervals are intervals sampling at a sampling clock of 9.6 KHz.

17. A communication apparatus for communicating digital data representing a modulated signal via a digital transmission path, said apparatus comprising:

procedure means for performing a communication control procedure;

first conversion means for converting a communication control procedure signal into first digital signals and outputting said first digital signals at first intervals, said first digital signals representing a modulated signal modulated by a modulation process in accordance with the communication control procedure signal, and said first intervals being predetermined for the modulation process; and second conversion means for converting said first digital signals, input at said first intervals, into second digital signals representing the modulated signal at second intervals which are different from said first intervals and which correspond to a sampling frequency of the digital transmission path, and outputting said second digital signals at said second intervals to the digital transmission path.

18. An apparatus according to claim 17, wherein said first conversion means sequentially converts said communication control procedure signal input at the first intervals into said first digital signals.

19. An apparatus according to claim 17, wherein said second conversion means converts said first digital signals input at said first intervals into said second digital signals at said second intervals by interpolation.

20. An apparatus according to claim 17, wherein said second intervals are equal to intervals between sampling clocks of said digital transmission path.

21. An apparatus according to claim 17, wherein said first intervals are shorter than said second intervals.

22. A method for generating digital signals representing a modulated signal to be transmitted via a digital transmission path, said method comprising the steps of:

inputting digital transmission signals;

producing first digital signals, using a modulation process, representing the modulated signal corresponding to the digital transmission signals at first intervals, the first intervals being predetermined for the modulation process;

converting the first digital signals into second digital signals representing the modulated signal at second intervals which are different from the first intervals and which correspond to a sampling frequency of the digital transmission path; and outputting the second digital signals at said second intervals to the digital transmission path.

23. A method according to claim 22, wherein the first digital signals are reproduced sequentially at the first intervals at the producing step.

24. A method according to claim 22, wherein the first digital signals are interpolated at the second intervals at the converting step.

25. A method according to claim 22, wherein the second intervals are intervals sampling at a sampling clock of 8.0 KHz.

26. A method according to claim 25, wherein the first intervals are intervals sampling at a sampling clock of 9.6 KHz.

27. A method according to claim 26, wherein five of the second digital signals are converted from six of the first digital signals.

28. A demodulating method for demodulating reception signals from a digital transmission path, said method comprising the steps of:
inputting digital reception signals from the digital transmission path at first intervals which correspond to a sampling frequency of the digital transmission path;
converting the digital reception signals into converted digital signals which have values of an envelope represented by the digital reception signals sampled at second intervals different from the first intervals; and
demodulating the converted digital signals.

29. A demodulating method according to claim 28, wherein symbol data is obtained at the demodulating step.

30. A demodulating method according to claim 28, wherein the digital reception signals are interpolated at the second intervals at the converting step.

31. A demodulating method according to claim 28, wherein the first intervals are intervals sampling at a sampling clock of 8.0 KHz.

32. A demodulating method according to claim 28, wherein the second intervals are intervals sampling at a sampling clock of 9.6 KHz.

33. A demodulating method according to claim 28, wherein six of the converted digital signals are converted from five of the digital reception signals at the converting step.

34. A demodulating method for demodulating reception signals from a digital transmission path, said method comprising the steps of:
inputting, from the digital transmission path, digital reception signals representing a modulated signal at first intervals which correspond to a sampling frequency of the digital transmission path;
interpolating the digital reception signals at second intervals different from the first intervals such that the interpolated digital reception signals represent the modulated signal; and
demodulating the interpolated digital reception signals.

35. A demodulating method according to claim 34, wherein symbol data is obtained at the demodulating step.

36. A demodulating method according to claim 34, wherein the first intervals are intervals sampling at a sampling clock of 8.0 KHz.

37. A demodulating method according to claim 36, wherein the second intervals are intervals sampling at a sampling clock of 9.6 KHz.

38. A demodulating method according to claim 34, wherein five of the digital reception signals are interpolated into six.

* * * * *

UNITED STATES PATENT AND TRADEMARK OFFICE
CERTIFICATE OF CORRECTION

PATENT NO. : 5,818,870
DATED : October 6, 1998
INVENTOR(S) : TATSUYA YAGUCHI

It is certified that error appears in the above-identified patent and that said Letters Patent is hereby corrected as shown below:

COLUMN 12

Line 4, "demodulation" should read --demodulation device--.
Line 6, "demodulation" should read --demodulation device--.

Signed and Sealed this

Fourth Day of January, 2000

Attest:

Attesting Officer

Acting Commissioner of Patents and Trademarks